No. 710,582. Patented Oct. 7, 1902.
A. JOHNSTON.
ADJUSTABLE SEAT FOR TWO WHEELED VEHICLES.
(Application filed July 9, 1902.)
(No Model.)

Witnesses
C. J. Williamson
M. E. Moore

Inventor
Abner Johnston
per Chas. H. Fowler
Attorney

THE NORRIS PETERS CO., PHOTO-LITHO., WASHINGTON, D. C.

UNITED STATES PATENT OFFICE.

ABNER JOHNSTON, OF NEW YORK, N. Y., ASSIGNOR OF ONE-HALF TO CLARENCE L. COLLINS, OF NEW YORK, N. Y.

ADJUSTABLE SEAT FOR TWO-WHEELED VEHICLES.

SPECIFICATION forming part of Letters Patent No. 710,582, dated October 7, 1902.

Application filed July 9, 1902. Serial No. 114,957. (No model.)

*To all whom it may concern:*

Be it known that I, ABNER JOHNSTON, a citizen of the United States, residing at New York, in the county of New York and State of New York, have invented certain new and useful Improvements in Adjustable Seats for Two-Wheeled Vehicles; and I do hereby declare that the following is a full, clear, and exact description of the same, reference being had to the annexed drawings, making a part of this specification, and to the letters of reference marked thereon.

The present invention has for its object to provide a driver's seat for hansoms or other two-wheeled vehicles in which the seat is capable of adjustment in a direction to or from the vehicle, so that the same will be properly balanced to adapt the vehicle to one or more passengers. This balancing of the vehicle by the adjustability of the driver's seat to bring the weight of the driver at the desired position not only relieves the horse when going up or down a hill, but gives the driver more ease and comfort.

The invention therefore consists in an adjustable driver's seat for two-wheeled vehicles constructed substantially as and for the purpose set forth and hereinafter claimed.

Figure 1:
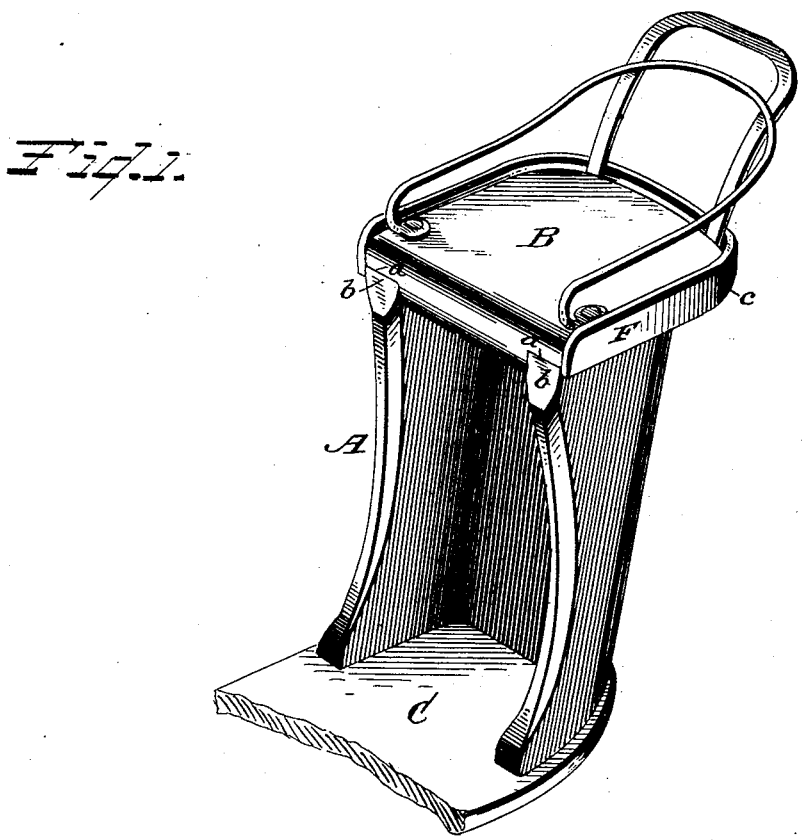
Figure 2:
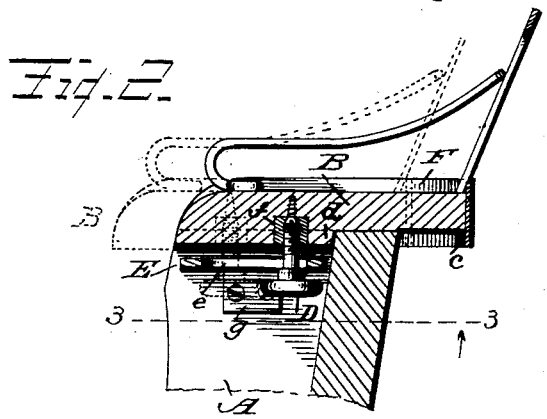
Figure 3:
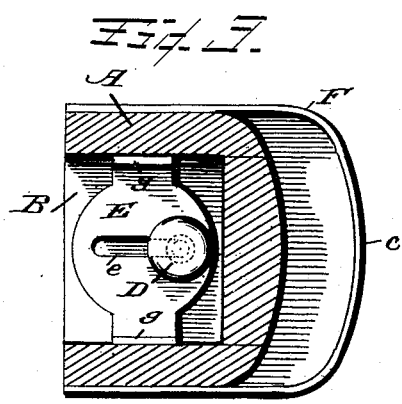

Figure 1 of the drawings is a perspective view of a driver's seat embodying my invention; Fig. 2, a detail sectional view showing the seat in two positions in full and dotted lines, respectively. Fig. 3 is an under side sectional view showing the means employed for holding the seat in its adjusted position.

In the accompanying drawings, A represents the shell or standard which supports the slidable seat B, and C the footboard, which joins the rear end of a hansom in the usual manner.

The seat B, which may be of any suitable form and construction, has longitudinal guide-grooves $a$ upon its under side, with which engage the guides $b$ upon the upper portion of the shell or standard A, as shown in Fig. 1 of the drawings. The seat B is slidable upon the shell or standard, as indicated in dotted lines of Fig. 2 of the drawings, the forward-and-backward movement of the seat being regulated by the stops $c$ $d$, which abut against the shell or standard to limit the extent to which the seat is adjusted forward or backward. The seat is held in its adjusted position by means of a set-screw D, extending up through a slot $e$ in a brace-plate E, the shank of the set-screw engaging the threads in a stationary screw-nut $f$. The set-screw bears with frictional contact against the brace-plate and holds the seat in its adjusted position, and to adjust the position of the seat the set-screw is first loosened and the seat moved back or forward to the desired position to balance the load, whether light or heavy or going uphill or down.

The stop $c$, as will be noticed, is formed by the downward-projecting portion of the strengthening-band F, said band extending below the seat upon both its sides and rear end. The band serves the double function of a stop at the rear end of the seat, and the depending sides of the band form the outer side walls to the guide-grooves $a$, thereby securely holding the seat against lateral or sidewise movement when adjusting the position of the same.

There are no slots, bolts, or nuts upon the upper side of the seat to mar its appearance or weaken the seat. All that is secured to the under side of the seat is the stationary screw-nut with which the set-screw engages, the slotted brace-plate E having downwardly-extending flanges $g$ by which the plate is secured to the sides of the shell or standard A.

The stationary screw-nut secured to the under side of the seat, the slotted brace-plate secured to the shell or standard, and the set-screw extending through the slot of the plate and engaging the screw-nut provide a very simple and practical means to enable the seat to be adjusted and to hold it in its adjusted position. This adjustability of the seat for the purpose hereinbefore described provides a simple and practical means of equalizing the weight, the seat being moved backward and forward at will while the vehicle is in motion and securely held in its adjusted position.

Having now fully described my invention, what I claim as new, and desire to secure by Letters Patent, is—

1. A slidable and adjustable driver's seat having a stationary screw-nut upon the under side thereof, in combination with a shell or standard for supporting the seat and forming a guide therefor, a slotted brace-plate secured to the shell or standard below the seat, and a set-screw extending up through the slot in the brace-plate and engaging the screw-nut, substantially as and for the purpose set forth.

2. An adjustable driver's seat, a stationary screw-nut secured to the under side thereof, vertical guide-grooves upon the under side of the seat, a band extending around the sides and back of the seat to form the outer side walls to the grooves and a stop for the seat respectively, a shell or standard for supporting the seat having guides upon its upper edge to engage the grooves, a slotted brace-plate secured to the sides of the shell or standard, and a set-screw extending through the slot of the plate and engaging the screw-nut, substantially as and for the purpose described.

In testimony that I claim the above I have hereunto subscribed my name in the presence of two witnesses.

ABNER JOHNSTON.

Witnesses:
WM. A. TAYLOR,
J. E. FITZSIMONS.